May 21, 1963 J. A. ALLEN 3,090,374
CIRCULATING HOT AIR FURNACE
Filed Aug. 12, 1960 2 Sheets-Sheet 1

INVENTOR:
Joseph A. Allen
BY Hofgren, Brady,
Wegner, Allen & Stellman
Att'ys

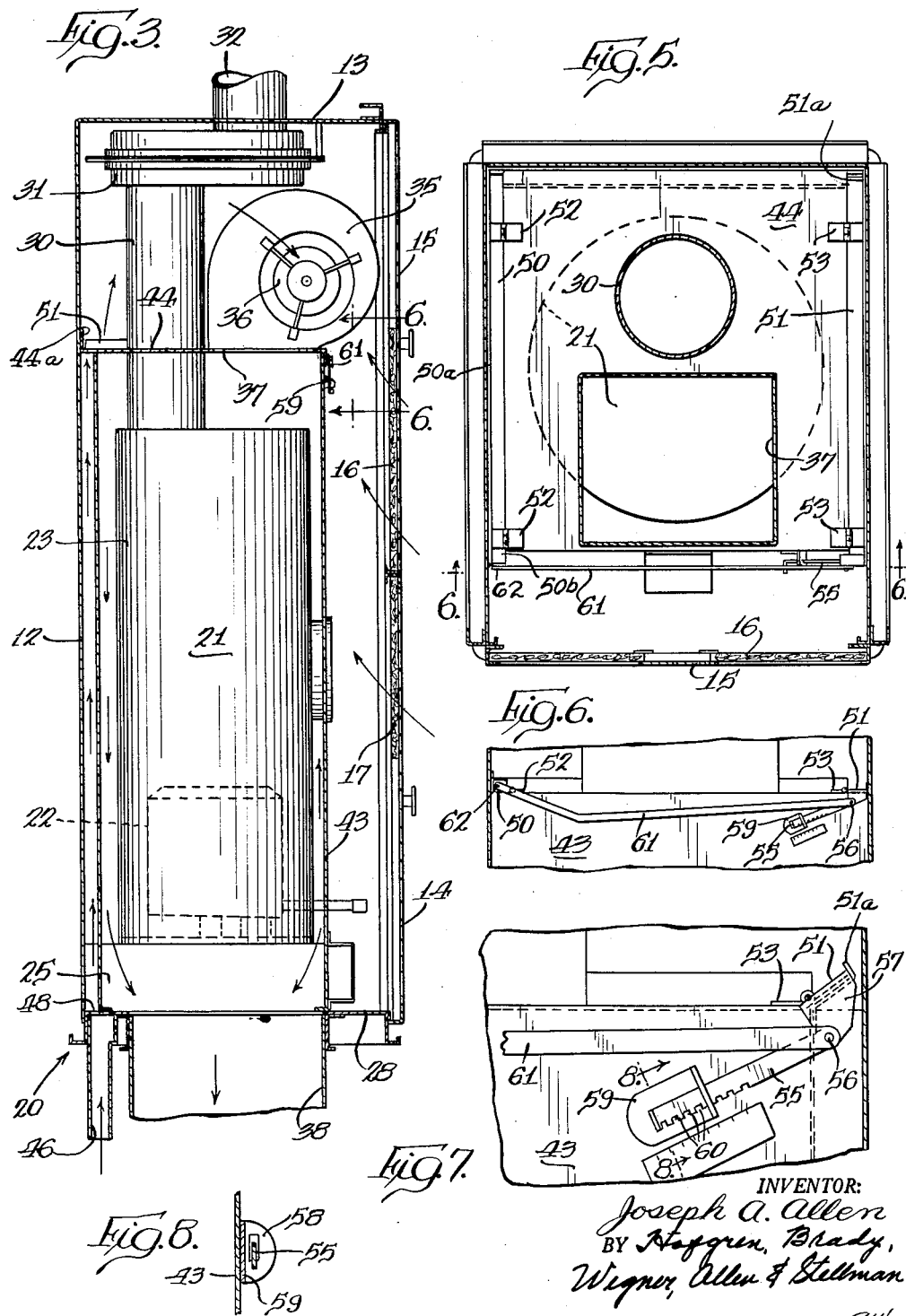

United States Patent Office 3,090,374
Patented May 21, 1963

3,090,374
CIRCULATING HOT AIR FURNACE
Joseph A. Allen, Wisconsin Rapids, Wis., assignor to Preway Inc., a corporation of Wisconsin
Filed Aug. 12, 1960, Ser. No. 49,252
3 Claims. (Cl. 126—110)

This invention relates to a circulating air furnace and more particularly to a circulating air furnace utilizing outside air for insulating the furnace and supply of air to the circulating system with the rate of supply being adjustable whereby the furnace is readily usable in a mobile home.

An object of this invention is to provide a new and improved circulating air furnace in which the return air to the furnace may merely be recirculated or an adjustable amount of outside air can be added to the circulating air, with the outside air always functioning to insulate the furnace.

Another object of the invention is to provide a furnace with a circulating hot air system in which insulating spaces are provided through which outside air passes with said outside air being supplied to the circulating air system at a variable rate and the rate of supply of outside air being determined by manually operable adjustment means.

Another object of the invention is to provide a furnace having a blower for a forced air circulating system, a casing with exterior walls, air inlets in the casing for receiving air from the adjacent space, a combustion unit within the furnace, a shield for the combustion unit including walls spaced from the casing exterior walls to define an insulating air space, means connecting the insulating air space between the exterior walls and shield walls with outside air, said insulating air space being in communication with said blower, and manually operable means for regulating the flow of air through said insulating air space.

Still another object of the invention is to provide a furnace as defined in the preceding paragraph in which the air flow regulating means embodies a pair of air shutters disposable across the insulating space to control the air passage therethrough with a manually operable member for positioning one of the shutters and a motion transmitting connection for causing movement of the other shutter along with said first shutter.

Further objects and advantages will become apparent from the following detailed description taken in connection with the accompanying drawings in which:

FIG. 3 is a vertical section through the furnace taken generally along the line 3—3 in FIG. 2;

FIG. 5 is a horizontal section on an enlarged scale taken generally along the line 5—5 in FIG. 2;

FIG. 6 is a fragmentary elevational view on an enlarged scale of the air flow regulating means shown in FIG. 2 near the top of the furnace;

FIG. 7 is an enlarged detail view of a part of the air flow regulating means shown in FIG. 6 in a different position; and FIG. 8 is a fragmentary end view of the manually operable member for adjusting the air flow regulating means shown in FIG. 7.

Figure 1:
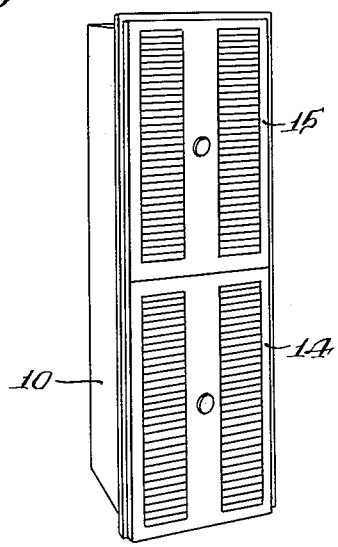
FIG. 1 is a perspective elevational view of the furnace looking toward the front thereof with a base omitted.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figure 2:
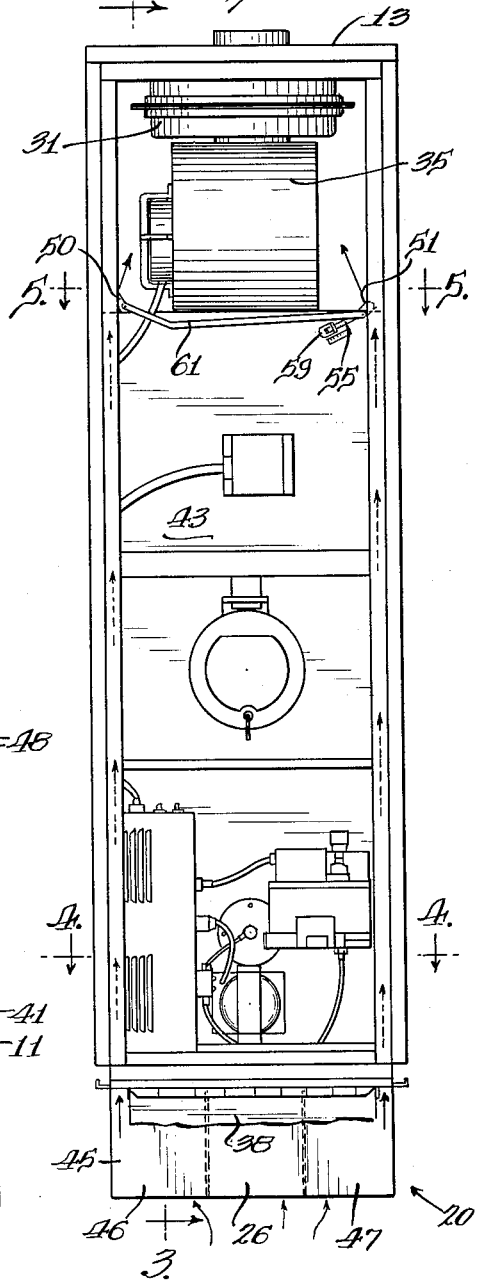
FIG. 2 is a front elevational view of the furnace on an enlarged scale with front panels removed and a base in place.
Figure 4:
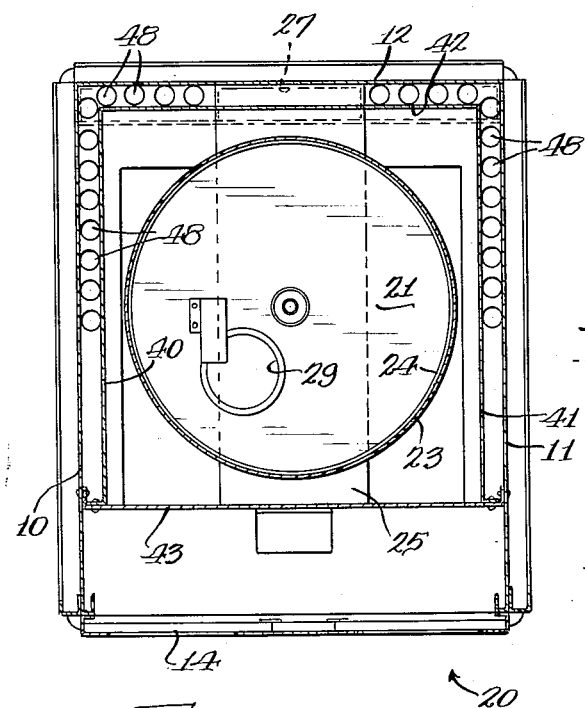
FIG. 4 is a horizontal section on an enlarged scale taken generally along the line 4—4 in FIG. 2.

As shown in the drawings, the furnace embodies a casing having side walls 10 and 11, a rear wall 12 and a top wall 13. The front of the casing has a pair of louvered panels 14 and 15 which are readily removable for access to the interior of the furnace and which carry filters 16 and 17 respectively for cleansing of the return air entering into the furnace casing. The casing is placeable upon a base not shown in FIG. 1, but shown in FIGS. 2, 3 and 4, which is indicated generally at 20.

The furnace casing has mounted therein a combustion unit 21 which embodies a burner pot indicated in broken line at 22 in FIG. 3 which is positioned within a cylindrical heat drum 23 which at its lower end interfits with an upturned flange 24 of a circular plate having an air duct 25 associated therewith. Air is supplied to the combustion unit 21 by passage through a central inlet channel 26 extending below the casing which communicates through an opening 27 in a plate 28 of the base 20 with the duct 25 having an inlet 29 into the combustion unit.

The combustion gases rise from the heat drum 23 through a flue 30 and a heat economizer 31 to outlet connection 32 to a roof jack (not shown).

In the air circulating system, return air entering through the front panels 14 and 15 passes to a blower 35 mounted adjacent the top of the furnace having an inlet 36 for the air. A blower outlet 37 connects into a space surrounding the combustion unit 21 and air passes downwardly therepast through the base 20 of the unit to either side of the air duct 25 and on out through a duct connector 38 for connection to ducts carrying the heated air to desired locations.

The space for the circulating air about the combustion unit 21 is defined by a shield having side walls 40 and 41, and rear wall 42, which extend upwardly from the base 20 to a location above the combustion unit 21. The shield side walls 40 and 41 and the rear wall 42 are spaced from the corresponding side walls 10 and 11 and rear wall 12 of the casing to provide an insulating air space. A front wall 43 of the shield extends between the casing side walls 10 and 11 to define a front to the insulating air spaces. A top wall 44 of the shield having the blower inlet opening 37 therein extends from the front shield wall 43 back to the rear casing wall 12 at flange 44a, but terminates short of the casing side walls 10 and 11 to connect the insulating air spaces with the area of the furnace above the shield and particularly to place the spaces in air flow communication with the blower inlet 36. The front and rear walls of the shield are shaped to fit around the transverse air duct 25 and extend down to the base 20 as shown in FIG. 3.

With the furnace being particularly suitable for use in a mobile home, the base 20 has the duct 45 extending downwardly which has the passage 26 for combustion air and which also has passages 46 and 47 for outside air which communicate with the insulating air spaces between the shield walls and the casing walls through a plurality of openings 48 in the base plate 28.

With the insulating air spaces between the side walls 10 and 40 and 11 and 41 respectively, open to the interior of the furnace casing and in flow communicating communication with the blower inlet 36, it is possible to mix outside air with the circulating air. This also permits use of the furnace as a circulating air blower when combustion unit is not operating.

Manual adjustment means operable from the front of the furnace upon removal of the front panel 15 are provided to control the supply of outside air to the furnace for circulation or to provide for little or no supply of outside air. This means is shown in FIGS. 2, 3 and 5–8 and comprises a pair of air shutter plates 50 and 51 having wall engaging flanges 50a and 51a, respectively, each pivotally mounted to pairs of brackets 52 and 53, respectively, attached to the top wall 44 of the shield. As shown in FIGS. 5 and 6, the air shutters 50 and 51 are disposed generally horizontal so as to substantially block the upper ends of the side wall air insulating spaces and prevent flow of outside air to the blower inlet 36. The air shutters may be moved to various positions of adjustment to open the insulating air spaces a desired amount, with one of the positions being shown in FIG. 7. The means for moving the air shutters embodies a manually operable member 55 having a pivot connection 56 to a downturned flange 57 of the shutter 51. The member 55 is mounted for lengthwise movement within a slot 58 in a bracket 59 secured to the front wall 43 of the shield and the member has notches 60 which coact with the bracket 59 to hold the member 55 in a desired position of adjustment. The shutter 50 is caused to assume a position corresponding to that shown for the shutter 51 by a motion transmitting connection in the form of a link 61 which extends from the pivot connection 56 to a pivot connection 62 with a flange 50b of the shutter 50.

With the foregoing structure, the shutters 50 and 51 may be positioned at a desired angle or in a horizontal position to provide either for a desired amount of flow of outside air to the blower inlet 36 or in the horizontal position to substantially block off flow of outside air.

I claim:

1. In a circulating air furnace for a mobile home, in combination, an exterior casing with a rear wall and side walls and having air inlet openings, a combustion unit positioned within the casing, a heat shield surrounding said combustion unit with rear and side walls spaced from said unit, said shield walls also being spaced from the rear and side walls of the casing to define an insulating air space, said shield having a front wall extending between the side walls of the casing, and a top wall extending from the shield front wall to the back wall of the casing and to the side walls of the shield, means for moving circulating air downwardly between the combustion unit and the heat shield for emission to the exterior of the furnace including a blower near the top of said shield having an inlet for receiving air from said air inlets in the casing and in communication with said insulating air space, a duct extending downwardly beneath the casing for extension to the outside of the mobile home and in communication with said insulating air space, and means mounted adjacent the top of said heat shield for regulating the flow of air from said insulating air space to the blower inlet and for blocking said flow.

2. A furnace as defined in claim 1 in which the air flow regulating means includes a pair of movable shutters positionable across the space between the casing side walls and the shield side walls, and means for simultaneously moving said shutters between closed and one of several different open positions.

3. A furnace as defined in claim 1 in which said air flow regulating means comprises a pair of air shutters mounted on said air shield adjacent the top thereof and associated one with each side wall of the air shield, means pivotally mounting each shutter for movement between a position closing off the insulating air space between shield and casing side walls and positions permitting variable opening of said space to communicating relation with the blower inlet, a manually operable member connected to one of said shutters for pivoting thereof and a motion transmitting connection from the member to the other shutter for obtaining simultaneous pivotal movement of said shutters.

References Cited in the file of this patent

UNITED STATES PATENTS

| | | |
|---|---|---|
| 1,089,728 | Smith | Mar. 10, 1914 |
| 1,308,194 | Rohan | July 1, 1919 |
| 1,388,330 | Gardiner | Aug. 23, 1921 |
| 2,749,904 | Jones et al. | June 12, 1956 |
| 2,880,717 | Tilmann | Apr. 7, 1959 |